United States Patent [19]

Crisp et al.

[11] Patent Number: 5,043,943
[45] Date of Patent: Aug. 27, 1991

[54] CACHE MEMORY WITH A PARITY WRITE CONTROL CIRCUIT

[75] Inventors: Richard D. Crisp, Cupertino, Calif.; Taisheng Feng; Jennifer Y. Chiao, both of Austin, Tex.

[73] Assignee: Motorola, Inc., Schaumburg, Ill.

[21] Appl. No.: 539,651

[22] Filed: Jun. 18, 1990

[51] Int. Cl.[5] .................. G11C 7/00; G11C 8/00; G11C 11/407
[52] U.S. Cl. .................. 365/189.01; 365/200; 365/49; 371/51.1
[58] Field of Search .................. 365/200, 218, 189.01, 365/49, 189.05, 189.07.230.08; 364/200; 371/71, 51.1, 21.1, 21.2

[56] References Cited

U.S. PATENT DOCUMENTS

| | | | |
|---|---|---|---|
| 4,740,971 | 4/1988 | Tam et al. | 365/200 X |
| 4,831,625 | 5/1989 | Chiu et al. | 371/71 X |
| 4,860,262 | 8/1989 | Chiu | 365/189.01 |
| 4,862,418 | 8/1989 | Cuppens et al. | 365/189.01 X |
| 4,884,270 | 11/1989 | Chiu et al. | 365/189.07 X |
| 4,912,630 | 3/1990 | Cochcroft, Jr. | 364/200 |

Primary Examiner—Alyssa H. Bowler

[57] ABSTRACT

A parity SRAM having the capability to support byte parity is provided. The parity SRAM uses four (4) independent byte write enable ($BWE_x$) signals to enable a write amplifier to individually write a single parity bit to a selected memory location. The SRAM is designed to function in either a parity or a non-parity mode. A bonding option pad is connected to parity control logic circuitry, and determines whether the SRAM will function in the parity mode or the non-parity mode. The parity control logic circuitry generates a parity signal, based on the electrical connection of the option pad. Thus, when the option pad is connected to ground, the parity option is selected, whereas, when the option pad is connected to a positive power supply, then non-parity functionality is selected. When parity functionality is selected, the the SRAM will allow the four (4) independent $BWE_x$ signals to individually enable the write amplifier. When non-parity functionality is selected, a single control signal will enable the write amplifier, and the SRAM functions as a standard memory device.

13 Claims, 5 Drawing Sheets

CACHE MEMORY WITH A PARITY WRITE CONTROL CIRCUIT

CROSS REFERENCE TO RELATED APPLICATION

The present invention is related to U.S. patent application entitled "Cache Memory With Write Enable" Ser. No. 07/509,527, filed Apr. 12, 1990 by Richard D. Crisp et al. and assigned to the assignee hereof.

FIELD OF THE INVENTION

This invention relates generally to integrated circuit memories, and more particuly, to integrated circuit memories for use as a cache.

BACKGROUND OF THE INVENTION

Caching schemes are employed by computer designers to reduce access times by a processor to main memory, and hence, increase system performance. In many computing systems, main memory consists of a large array of memory devices with speeds which are slow relative to processor speeds. During accesses to main memory, the processor is forced to insert additional wait states to accommodate the slower memory devices. System performance during memory accesses can be enhanced with a high performance cache memory. Smaller in size than main memory and significantly faster, the cache memory provides fast local storage for data and instruction code which is frequently used by the processor. In computing systems with caches, memory operations by the processor are first transacted with the cache. The slower main memory is only accessed by the processor if the memory operation cannot be completed with the cache. In general, the processor has a high probability of fulfilling a majority of its memory operations with the cache. Consequently in computing systems which employ a cache memory, effective memory access times between a processor and relatively slow main memory can be reduced.

Shown in FIG. 1 is an example of a prior art data processing system 10 comprised of a processor 11, a cache 12, a cache controller 13, a main memory 14, and address bus 15, and a data bus 16. The cache 12 may be highly optimized according to a number of different features. One important feature which affects cache performance and design complexity is the handling of writes by the processor 11 or an alternate bus master (not shown). Since two copies of a particular piece of data or instruction code can exist, one in main memory 14 and a duplicate in the cache 12, writes to either main memory 14 or the cache 12 can result in incoherency between the two storage systems. Incoherency between the cache 12 and main memory 14 during processor writes is handled using two techniques. A first technique guarantees consistency between the cache 12 and main memory 14 by writing to both the cache 12 and the main memory 14 during processor writes ("write-through"). A second technique handles processor writes by writing only to the cache 12, and designating the cache entries which have been altered by the processor 11 ("write-back"). In some caching schemes it may be desirable to delay the performance of the memory write, pending a determination of whether a cache "hit" or "miss" occurred. A co-pending application entitled "Cache Memory With Write Enable" Ser. No. 07/509,527, by Richard Crisp et al, and assigned to the assignee hereof, discloses a cache memory with a write enable feature which allows the user to delay the write until the cache controller determines whether a cache "hit" or "miss" occurred.

The data processing system's ability to expeditiously handle write requests from the processor is often dependent upon the performance of the fast static random access memories (FSRAMs) used for the cache. Thus, FSRAM designs which provide features to support cache functionality may significantly enhance overall systems performance. For example, many of today's high performance data processing systems rapidly transmit data between the memory system, and the processor using a global data bus. Typically, these high performance systems rely upon some type of error checking scheme (i.e. parity, error correction code (ECC)) to insure the integrity of the data transferred. Typically, the size of the memory arrays used in cache memory does not warrant the complexity of ECC as an approach to error checking. Generally, simple parity checking provides the most cost efficient scheme for error checking.

In complex 32-bit data processing systems, parity checking is performed on a byte basis, therefore, necessitating the use of four (4) parity bits (one parity bit per byte of data). Typically, cache memory systems designed to support byte parity rely upon a unique memory device (i.e. FSRAM) to provide and store each parity bit. Thus, four (4) memory devices are required to support byte parity in a 32-bit data processing system. The use of four (4) memory devices to provide parity checking may degrade the overall system performance due to additional timing constraints. Furthermore, the loading on the control signals caused by four (4) memory devices, coupled with the additional power consumption attributable to the operation of the cache memory system, may also result in system performance degradation. Thus, it is desirable to provide a cache memory system capable of overcoming the foregoing problems.

SUMMARY OF THE INVENTION

In accordance with the present invention, in a memory, a parity write control circuit is provided for controlling the operation of a write amplifier in the memory. The parity write control circuit has input buffers for receiving a parity signal, and a plurality of write enable signals, and for providing the plurality of write enable signals, in response to a clock signal. Selection logic circuitry is coupled to the input buffer means, for receiving the parity signal, and the plurality of write enable signals, and for selectively providing at least one of the plurality of write enable signals, based upon a logic state of said parity signal. A driver is coupled to the selection logic circuitry, and the input buffers, for receiving the plurality of write enable signals from the selection means, and a single write enable signal from the input buffers, and for providing a plurality of write data control signals, in response thereto. The write data control signals enable the write amplifier to independently write a predetermined number of parity bits into the memory.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 2:
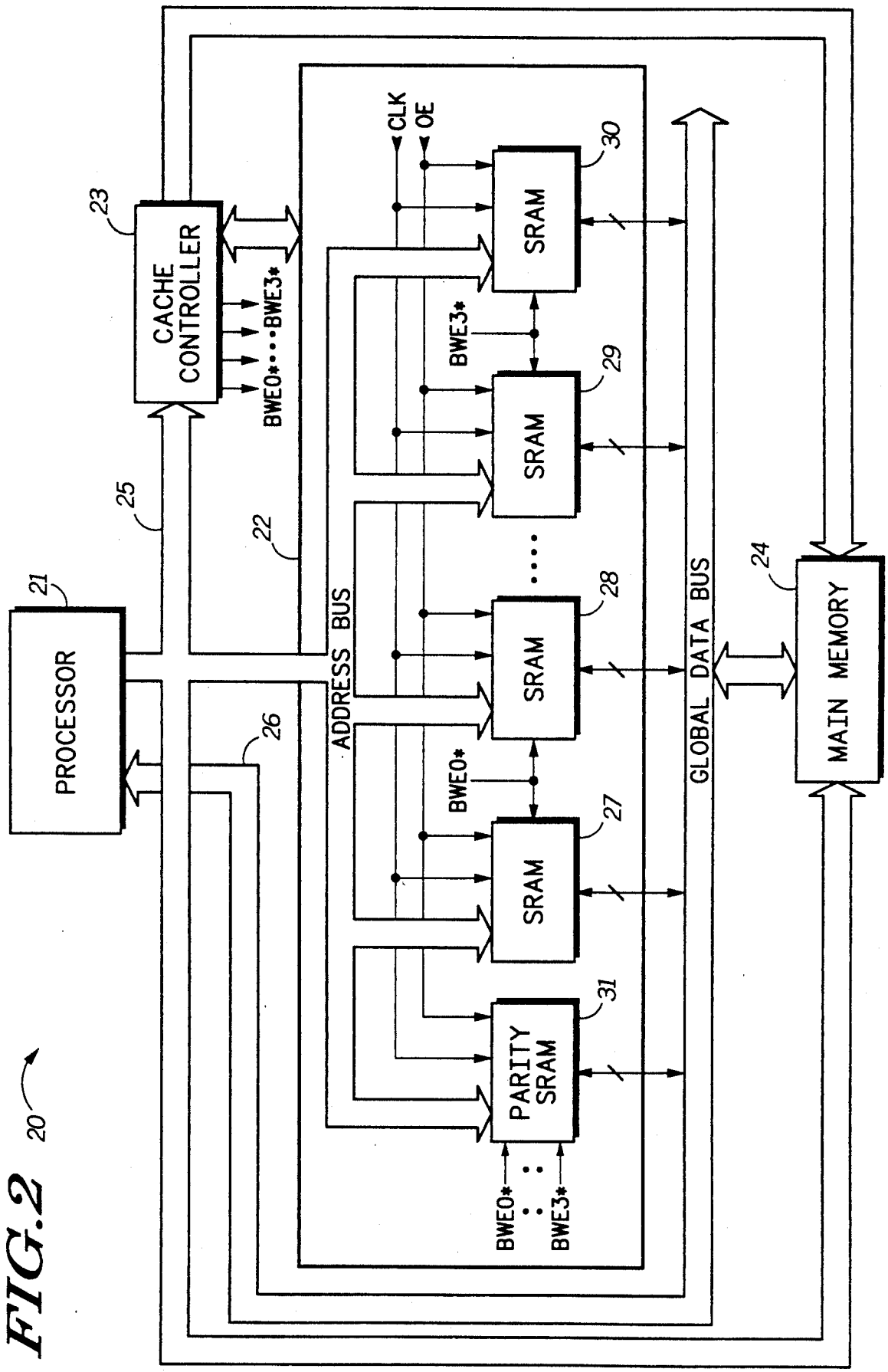
FIG. 2 is a detailed block diagram of a data processing system using a memory as a cache according to a preferred embodiment of the present invention.

Shown in FIG. 2 is a data processing system 20 comprising a processor 21, a cache memory 22, a cache controller 23, a main memory 24, an address bus 25, and a global data bus 26. In operation, processor 21 initiates a write cycle to update (modify) the data stored at a predetermined memory location in the cache 22 or main memory 24. The address is divided into two portions, an index portion, and a tag portion, both of which are transferred onto the address bus 25 by the processor 21. The cache controller 23 compares the tag portion of the requested address to a predetermined number of tag addresses stored in the cache 22, and thereby determines whether a cache "hit" or "miss" occurred. In the case of a cache "hit", the processor 21 transfers the pertinent data to the cache 22, via a global data bus 26. In the case of a cache "miss", processor 21 transfers the data to main memory 24, via the global data bus 26. Cache controller 23 may provide various control signals (e.g. transfer request, write enable) to the processor 21, cache 22, and main memory 24.

In a preferred embodiment, cache 22 comprises a 64K by 1 by 4 (64K×1×4) parity SRAM 31, and eight 64K by 4 static random access memories (SRAMs), however, for simplification purposes only four of the eight SRAMs 27-30 are illustrated in FIG. 2. Four asynchronous write strobe signals BWE$_0$*– BWE$_3$* function as byte write enable control signals for both the SRAMs 27-30 and the parity SRAM 31. Accordingly, when asserted by the cache controller 23, signals BWE$_0$*-BWE$_3$* function to allow the processor 21 to write data into selected memory locations in SRAMs 27-30, via the global data bus 26. For example, signal BWE$_0$* enables the write amplifiers of SRAMs 27 and 28, thereby allowing the processor 21 to write four (4) bits of data into each of the SRAMs 27 and 28, via the global bus 25. Similarly, signal BWE$_3$* enables the processor 21 to write four (4) bits of data into each of the SRAMs 29 and 30. In addition, signals BWE$_0$*-BWE$_3$* allow the processor 21 to individually write parity data into each bit position of the parity SRAM 31, thereby simplifying the task of supporting byte parity.

Figure 1:
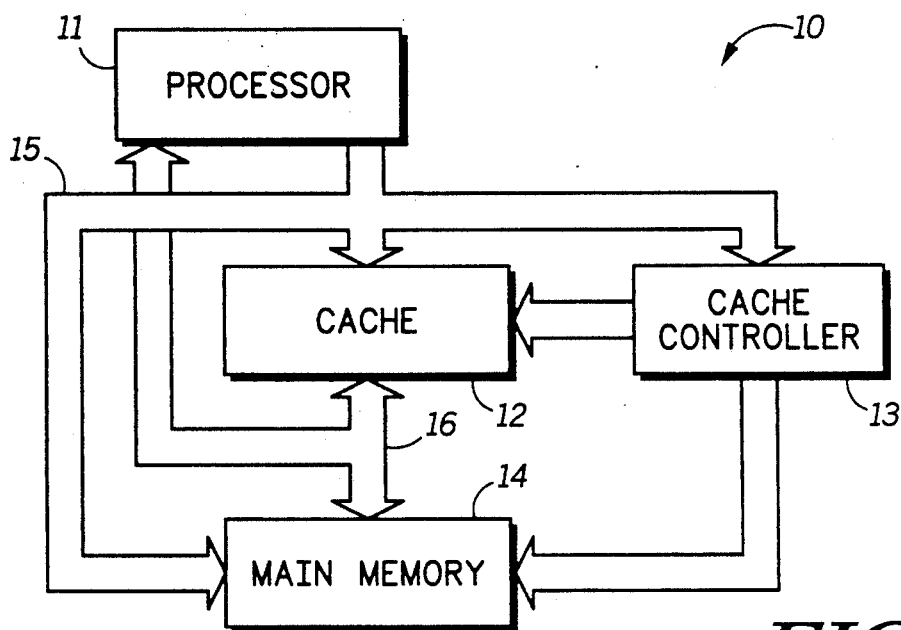
FIG. 1 is a general block diagram illustrating a data processing system using a memory as a cache according to the prior art.
Figure 3:
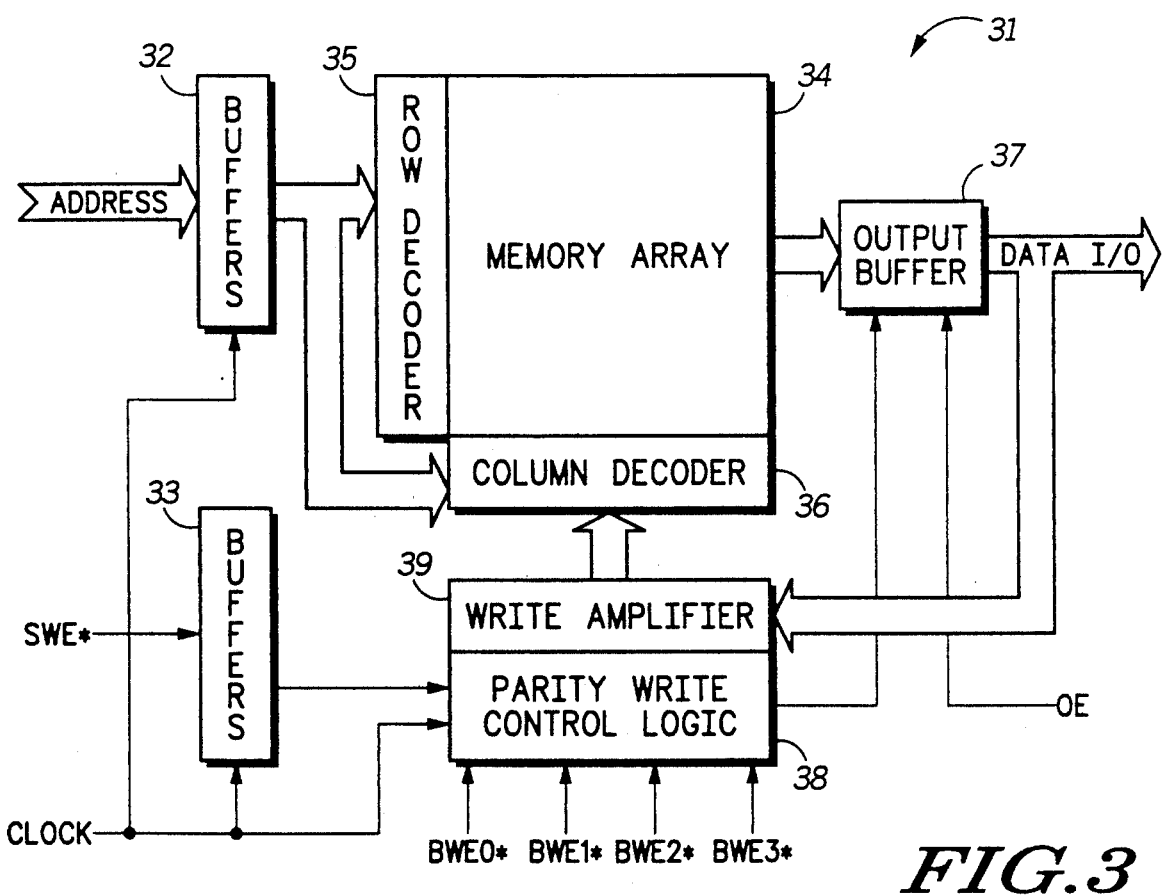
FIG. 3 is a block diagram of the parity SRAM of FIG. 2, according to a preferred embodiment of the present invention.

Shown in FIG. 3 is a block diagram of the parity SRAM 31, in accordance with the present invention. In a preferred embodiment, the parity SRAM 31 comprises buffers 32 and 33, a memory array 34, a row decoder 35, and column decoder 36, an output buffer 37, parity write control logic 38, and a write amplifier 39. Parity SRAM 31 integrates a 64K by 4 SRAM core with advanced peripheral circuitry on the address and synchronous write enable inputs. In the write mode, address buffers 32 receive a memory address from the address bus 25, and provide a predetermined number of address bits to the row and column decoders 35, and 36, respectively, thereby selecting a data location in the memory array 34. In response to receiving the BWE$_0$*-BWE$_3$* signals, the parity write control logic 38 provides write data enable control (WDEC$_x$) signal(s) to the write amplifier 39. The write amplifier 39 receives the parity data bits from the global data bus 26, and writes the parity bits into the selected location in memory array 34.

There are four (4) parity bit locations on data I/O bus. Each of the write data enable signals (WDEC$_0$-WDEC$_3$) is associated with a particular one of the four (4) parity bit locations. Each of the write data enable control signals, when asserted, causes the logic state at its associated parity bit location (e.g. bit 0) to be written into the location in memory array 34, at the selected memory address. When any of the WDEC$_x$ signal(s) are negated, the logic state(s) of the associated parity bit location(s) is not written into the memory array 34. The number of parity bits written into the memory array 34 is determined by the number of write data enable signals (WDEC$_0$-WDEC$_3$) asserted by the parity write control logic 38. Which, if any, of the four parity bits is written into the memory array 34 is thus determined by which of the write data enable control signals (WDEC$_0$-WDEC$_3$) is asserted by the parity write control logic 38, in response to the BWE$_x$ signals. Thus, the parity write control logic 38 provides a mechanism to allow the write amplifier 39 to individually write each parity bit into the memory array 34.

Figure 4:
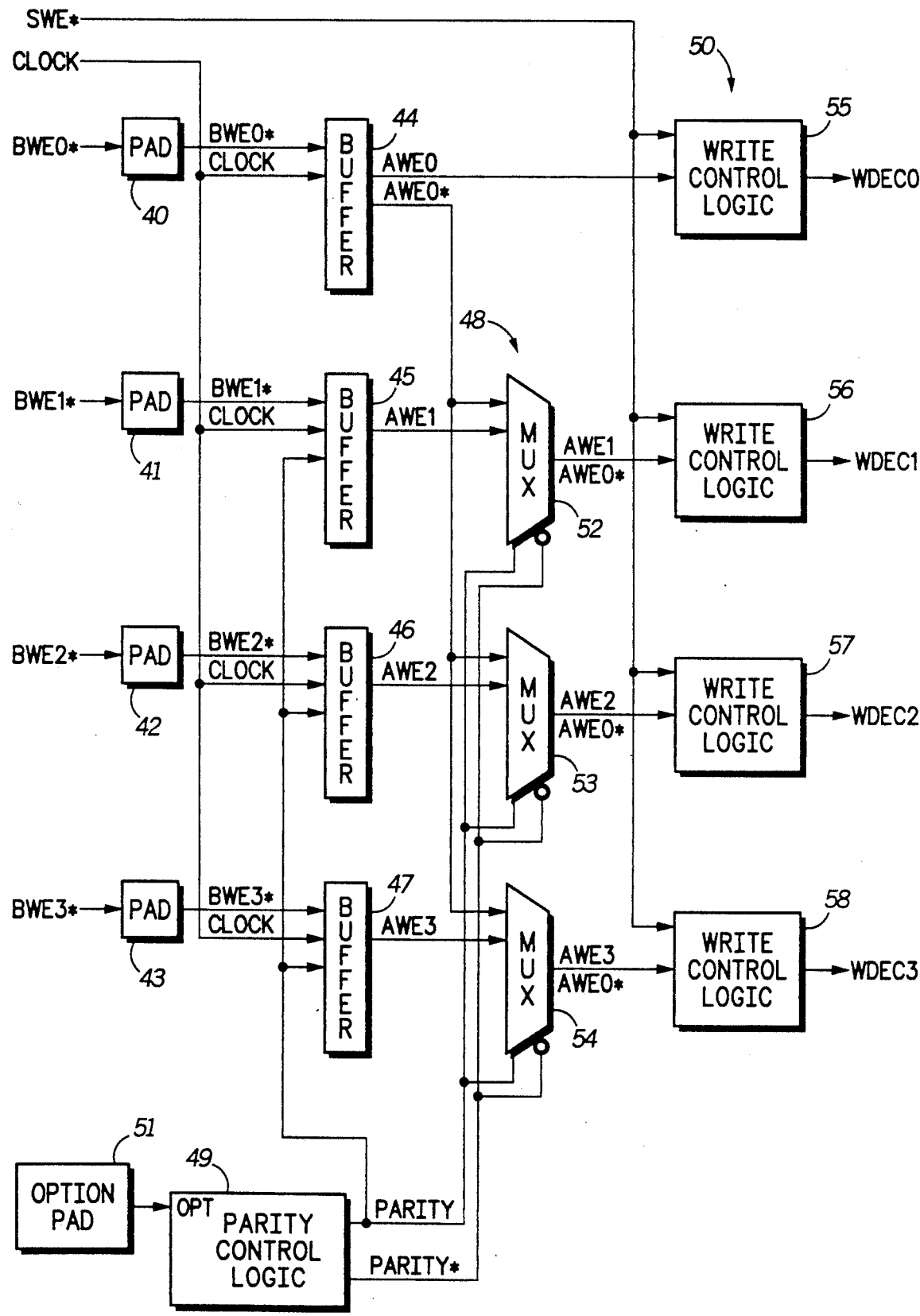
FIG. 4 is a block diagram of the parity write control logic circuitry of the parity SRAM of FIG. 3, in accordance with the present invention.

Shown in FIG. 4 is a block diagram illustrating the parity write control logic 38 of the parity SRAM 31. In the preferred embodiment, the parity write control logic 38 comprises input pads 40-43, input buffers 44-47, select control circuitry 48, parity control logic circuitry 49, write control logic circuitry 50, and a parity option pad 51. The select control circuitry 48 comprises three (3) multiplexors (MUXs) 52-54, which are individually coupled to the buffers 45-47, respectively. The write control logic circuitry 50 comprises four (4) write control logic blocks 55-58, for generating the write data enable clock signals WDEC$_0$-WDEC$_3$, respectively. In the present invention, the four (4) byte write enable signals BWE$_0$*-BWE3$_3$* function as a control clock signal for writing parity bit(s) into the parity SRAM 31, and for writing data into SRAMs 27-30. For the purpose of simplification, hereafter the byte write enable signals will be collectively referred to as BWE$_x$. Input pads 40-43 are coupled to the input buffers 44-47, as illustrated, and provide the respective BWE$_x$ signal to each of the buffers 44-47. In response to receiving the BWE$_x$ signals, input buffers 45-47 provide asynchronous write enable clock signals AWE$_1$-AWE$_3$ to the select circuitry 48. The select logic circuitry 48 receives the AWE$_x$ signals, and provides at least one of the $AWE_x$ signals to the write control logic circuitry 50. The write control logic circuitry 50 will assert from one to four write data enable clock signals ($WDEC_0-WDEC_3$), based upon the logic state of the asynchronous write enable input signals ($AWE_x$) provided by the select control circuitry 48

Figure 5:
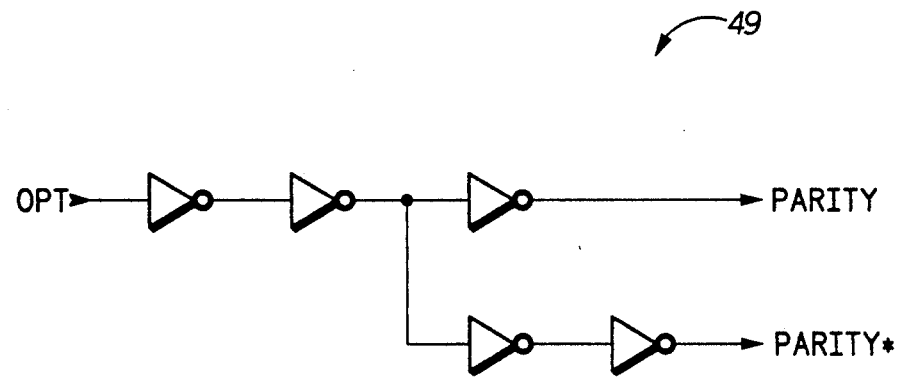
FIG. 5 is a circuit diagram of the parity control logic circuitry of the parity write control logic circuitry of FIG. 4.

In the present invention, any one of the four (4) independent byte write enable signals $BWE_x$ may enable the write data enable clock signals ($WDEC_x$). The logic state of a PARITY signal, provided by the parity control logic circuitry 49, determines whether a single enable signal ($BWE_0^*$), or all four enable signals ($BWE_0^*-BWE_3^*$) drive the write control logic circuitry 50. The parity control logic circuitry 49 comprises a bonding option driver, as shown in FIG. 5, which provides the PARITY signal (and complement thereof), based upon the bonding option selected. The parity option pad 51 (FIG. 4) is coupled to the parity control logic circuitry 49, and provides an option (OPT) signal based on a selected memory functionality. When parity memory functionality is desired, the parity option pad 51 (FIG. 4) is bonded to a negative power supply ($V_{SS}$), therefore, the OPT signal is negated. Consequently, the PARITY signal provided by the parity control logic circuitry is asserted. When non-parity memory functionality is desired, the parity option pad 51 (FIG. 4) is bonded to a positive power supply ($V_{DD}$), therefore, the PARITY signal is negated.

The incorporation of the parity option bonding scheme enables a semiconductor manufacturer to use an identical circuit design and wafer fabrication process for both the parity SRAM 31 and a non-parity SRAM (i.e. SRAMs 27–30). During the assembly process, the bonding option selected will determine the parity (or non-parity) functionality of the RAM device. Essentially, when non-parity functionality is selected, input pads 41–43 are not electrically connected to exterior leads. Thus, in the non-parity mode, there is only one (1) write enable control signal ($BWE_0^*$) to enable all four (4) of the $WDEC_x$ signals. Whereas, in the parity mode, input pads 41–43 are electrically connected to exterior leads. Consequently, there are four (4) independent write enable control signals ($BWE_0^*-BWE_3^*$) to enable the $WDEC_x$ signal. Thus, the parity control logic circuitry 49 is designed to provide a bonding selection for either a parity SRAM 31, or a non-parity SRAM, such as SRAMs 27–30.

Figure 6:
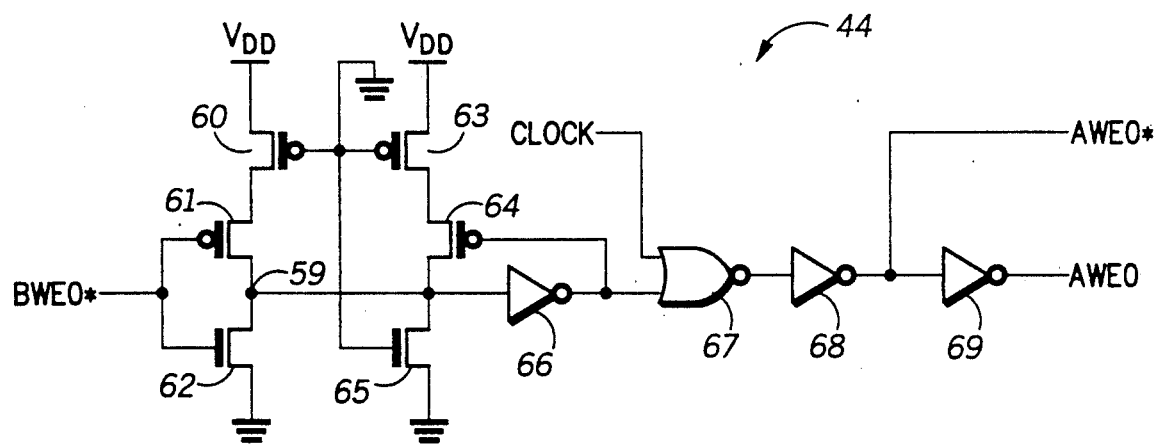
FIG. 6 is a circuit diagram of a first input buffer of the parity write control logic circuitry FIG. 4.

FIG. 6 illustrates a circuit diagram for buffer 44 of the parity write control logic 38. Buffer 44 comprises p-channel transistors 60, 61, 63 and 64, n-channel transistors 62, and 65, inverters 66, 68 and 69, and NOR gate 67. Transistor 60 has a gate connected to $V_{SS}$ (shown as ground), a source connected to $V_{DD}$, and a drain. Transistor 61 has a gate for receiving the $BWE_0^*$ signal, a source connected to the drain of transistor 60, and a drain connected to a node 59. Transistor 62 has a gate for receiving the $BWE_0^*$ signal, a source connected to the drain of transistor 61, and a drain connected to ground. Transistor 63 has a gate connected to ground, a source connected to $V_{DD}$, and a drain. Inverter 66 has an input connected to node 59, and an output. Transistor 64 has a gate connected to the output of inverter 66, a source connected to the drain of transistor 63, and a drain. Transistor 65 has a gate connected to ground, a source connected to the drain of transistor 64, and a drain connected to ground. NOR-gate 67 has a first input connected to the CLOCK signal, a second input connected to the output of inverter 66, and an output.

Inverter 68 has an input connected to the output of NOR gate 67, and an output for providing the complementary asynchronous write enable signal $AWE_0^*$. Inverter 69 has an input connected to the output of inverter 68, and an output for providing the $AWE_0$ signal.

Figure 7:
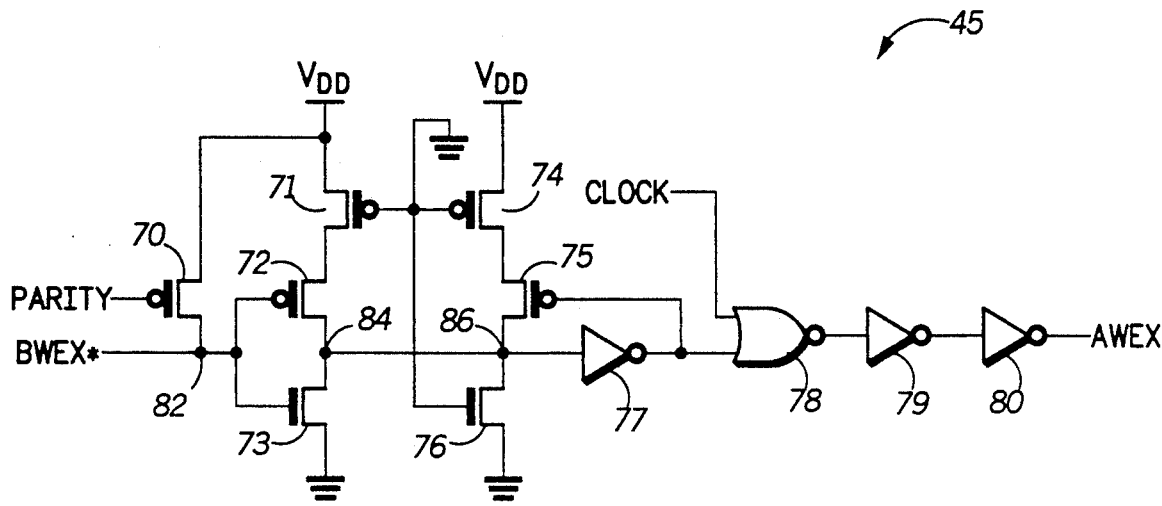
FIG. 7 is a circuit diagram of a second set of input buffers of the parity write control logic circuitry of FIG. 4.

In the preferred embodiment, buffers 45–47 are comprised of identical circuit elements. As shown in FIG. 7, each one of the buffers 45–47 comprises p-channel transistors 70, 71, 72, 74 and 75, n-channel transistors 73 and 76, inverters 77, 79, and 80, and NOR gate 78. Transistor 70 has a gate for receiving the PARITY signal, a source connected to $V_{DD}$, and a drain connected to node 82. Transistor 71 has a gate connected to $V_{SS}$ (shown as ground), a source connected to $V_{DD}$, and a drain. Transistor 72 has a gate for receiving the $BWE_x^*$ signal, a source connected to the drain of transistor 71, and a drain connected to a node 84. Transistor 73 has a gate for receiving the $BWE_x^*$ signal, a source connected to the drain of transistor 72, and a drain connected to ground. Transistor 74 has a gate connected to ground, a source connected to $V_{DD}$, and a drain. Inverter 77 has an input connected to a node 86, and an output. Transistor 75 has a gate connected to the output of inverter 77, a source connected to the drain of transistor 74, and a drain connected to a node 86. Transistor 76 has a gate connected to ground, a source connected to the drain of transistor 75, and a drain connected to ground. NOR gate 78 has a first input connected to the output of inverter 77, a second input for receiving the CLOCK signal, and an output. Inverter 79 has an input connected to the output of NOR gate 78, and an output. Inverter 80 has an input connected to the output of inverter 79, and an output for providing a the $AWE_1-AWE_3$ signals to select control circuitry 48.

Figure 8:
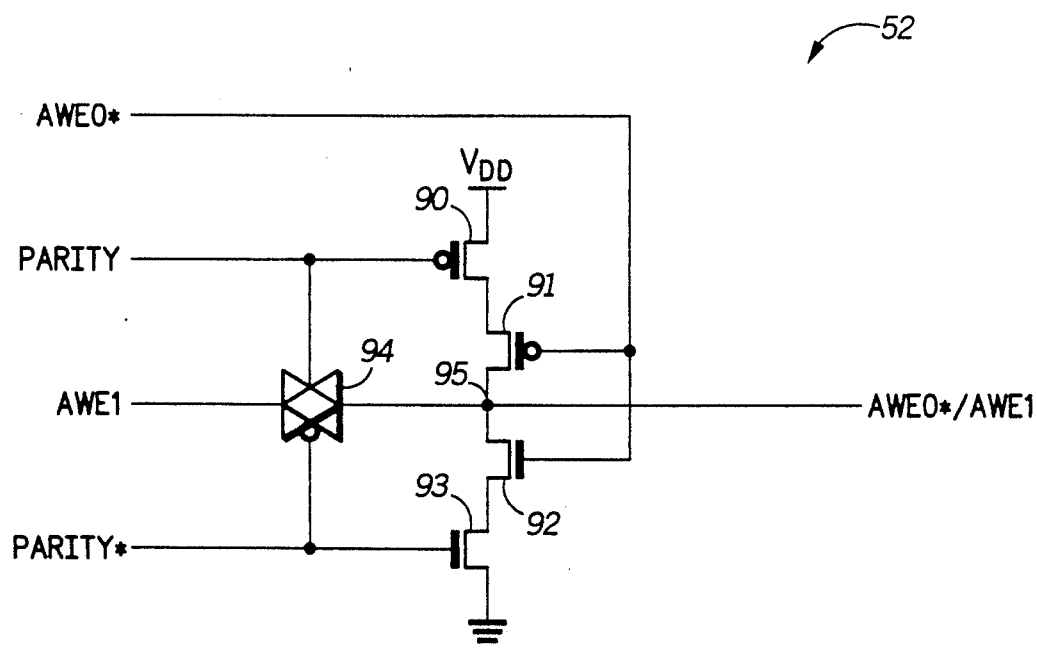
FIG. 8 is a circuit diagram of the select control circuitry of parity write control logic circuitry of FIG. 4.

Shown in FIG. 8 is a circuit diagram of MUX 52 of select control circuitry 48. As previously described, the select control circuitry 48 comprises three (3) MUXs 52–54. For purposes of simplification, only MUX 52 is illustrated herein, however, each of the three (3) MUXs 52–54 are comprised of identical circuit elements. MUX 52 comprises p-channel transistors 90 and 91, n-channel transistors 92 and 93, and transmission gate 94. Transmission gate 94 has a true input for receiving a PARITY control signal, an inverted input for receiving a complementary parity control signal (PARITY*), a first terminal for receiving the $AWE_1$ signal from buffer 45, and a second terminal for providing the $AWE_1$ signal at an output node 95. Transistor 90 has a gate for receiving the PARITY signal, a source connected to a positive power supply terminal ($V_{DD}$), and a drain. Transistor 91 has a gate for receiving the complementary asynchronous write enable signals ($AWE_0^*$), a source connected to the drain of transistor 90, and a drain connected to the output node 95 for providing the the selected asynchronous write enable clock signal ($AWE_0^*$). Transistor 92 has a gate for receiving $AWE_0^*$, a source connected to node 95, and a drain. Transistor 93, has a gate for receiving the PARITY* signal, a source connected to the drain of transistor 92, and a drain connected to a negative power supply terminal, shown as ground.

In the parity mode of operation, the parity option pad 51 is bonded to $V_{SS}$, therefore, the parity control logic 49 provides a logic high PARITY signal to the input buffers 45–47, and the select control logic circuitry 48. Input buffers 45–47 receive the logic high PARITY signal, their respective byte write enable signal ($BWE_1^*-BWE_3^*$), and the CLOCK signal, and provide asynchronous write enable control signals (AWE$_1$-AWE$_3$) to the select control logic circuitry 48, in response thereto. When the BWE$_0$* signal is asserted (logic low), buffer 44 provides a logic high AWE$_0$ signal (and conversely, a logic low AWE$_0$* signal), due to the operation of NOR gate 67 (FIG. 6). The logic high AWE$_0$ signal drives the WDEC$_0$ signal generated by write control logic block 55, to allow the write amplifier 39 to write parity bit 0 into the memory array 34. The select control logic circuitry circuitry 48 receives the logic low AWE$_0$* control signal, and the logic high true and logic low complementary parity signals, PARITY and PARITY*, respectively. When signal BWE$_1$* is asserted (logic low), and the PARITY signal is asserted (logic high), buffer 45 provides a logic high AWE$_1$ signal to MUX 52.

Since signal BWE$_0$* is also asserted (logic low), buffer 44 provides a logic low AWE$_0$* signal to MUX 52. Transistor 91 receives the logic low AWE$_0$* signal at its gate electrode, and becomes conductive. The logic high PARITY signal, causes transistor 90 to be non-conductive, therefore, MUX 52 does not couple the AWE$_0$* signal to the output node 95. Since the PARITY signal is a logic high, and its complement, PARITY* a logic low, transmission gate 94 is conductive. Consequently, MUX 52 couples the logic high AWE$_1$ signal to the output node 95, thereby providing the asynchronous write enable signal (AWE$_1$) to write control logic block 56. The AWE$_1$ signal is a logic high, therefore, the write control logic block 56 asserts the WDEC$_1$ signal, thereby enabling the write amplifier 39 (FIG. 3) to write the corresponding parity data bit to the selected data location in memory array 34. Accordingly, in the parity mode, when the AWE$_0$* signal is a logic low, MUXs 52-54 will select the corresponding write enable signals AWE$_1$-AWE$_3$, respectively, to drive the write control logic 39. Accordingly, signals AWE$_1$-AWE$_3$ will drive signals WDEC$_1$-WDEC$_3$, respectively, thereby allowing the write amplifier 39 to independently write the associated parity bit (i.e. parity bit 1:3) into the memory array. Similarly, the AWE$_0$ signal drives the WDEC$_0$ signal, thereby providing the capability to independently write parity bit 0.

In the non-parity mode of operation, the parity option pad 51 (FIG. 4) is bonded to V$_{DD}$, therefore, the parity control logic 49 provides a logic low PARITY signal to the input buffers 45-47, and the select control logic circuitry 48. As previously indicated, when non-parity functionality is selected, input pads 41-43 are not electrically connected, therefore, signals BWE$_1$*-BWE$_3$* are not coupled to the input buffers 45-47. Consequently, the sole input to buffers 45-47 (FIG. 7) is the logic low PARITY signal, and thus, BWE$_0$* is the only control signal for generating the WDEC$_x$ control signals. Accordingly, buffers 45-47 receive the logic low PARITY signal, and provide a logic low AWE$_x$ signal to MUXs 52-54 (FIG. 8), respectively. Since the PARITY signal is a logic low, transmission gate 94 is non-conductive, therefore, MUXs 52-54 will not pass the AWE$_x$ signal to the output node 95. Conversely, transistor 90 becomes conductive, in response to the logic low PARITY signal. As previously indicated, during a write cycle, the BWE$_0$* signal is asserted (logic low). Buffer 44 provides, therefore, a logic low AWE$_0$* signal to MUX 52, thereby causing transistor 91 become conductive and provide a logic high signal at the output node 95. Thus, signal AWE$_0$* simultaneously drives signals WDEC$_0$-WDEC$_3$, and thereby controls the operation of the write amplifier 39.

It should now be apparent that the present invention utilizes four (4) independent byte write enable signals BWE$_0$*-BWE$_3$* (BWE$_x$) to provide the capability to independently write a parity data bit into a memory array 34. Based upon the logic state of the PARITY signal, select control circuitry 48 functions to allow either four (4) asynchronous write enable signals AWE$_0$-AWE$_3$ to independently drive the write amplifier 39, or alternatively, to allow the AWE$_0$* signal to drive the write amplifier 39. In the parity mode of operation, the PARITY signal is asserted, when a set of input buffers 45-47 receive their respective BWE$_x$ signal. Since the PARITY signal is asserted, transmission gate 94 of the select control circuitry 48 will couple the AWE$_x$ signal to the write control logic circuitry, thereby driving the corresponding WDEC$_x$ signal. The WDEC$_x$ signal will either enable or disable the operation of the write amplifier 39. In the non-parity mode of operation, the PARITY signal is negated, and input buffers 45-47 do not receive a BWE$_x$ signal, due to the absence of an electrical connection of input pads 41-44. When the PARITY signal is negated, the BWE$_0$* signal simultaneously drives signals WDEC$_0$-WDEC$_3$, and parity SRAM 31 functions in a like manner as SRAMs 27-30.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. In a memory, a parity write control circuit for controlling the operation of a write amplifier in said memory, said parity write control circuit comprising:
   means for selecting a location in said memory, in response to receiving a memory address;
   input buffer means for receiving a parity signal, and a plurality of write enable signals, and for providing said plurality of write enable signals, in response to a clock signal;
   selection means coupled to said input buffer means, for receiving said parity signal, and said plurality of write enable signals, and for selectively providing at least one of said plurality of write enable signals, based upon a logic state of said parity signal;
   driver means coupled to said selection means, and said input buffer means, for receiving said plurality of write enable signals, and for providing a plurality of write data control signals, in response thereto, said write data control signals enabling said write amplifier to independently write said parity data signal associated with a particular write data control signal into said memory; and
   means for coupling the parity data signal, associated with the particular write data control signal, to the selected location in said memory, in response to said particular write data control signal being asserted.

2. The circuit of claim 1 further comprising parity control circuitry coupled to said input buffer means, and said selection means for providing a logical true parity signal to said input buffer means, and for providing said logical true parity signal, and a complement thereof to said selection means.

3. The circuit of claim 2 wherein said selection means provides said plurality of write enable signals in response to said parity signal having a first logic value, and provides a single write enable signal, in response to said parity signal having a second logic value.

4. The circuit of claim 3 further comprising option select circuitry having an input selectively coupled to either a positive power supply terminal, or a negative power supply terminal, and an output for providing an option signal to said parity control logic circuitry, said option select circuitry thereby controlling the logic state of said parity signal.

5. The circuit of claim 1 wherein said memory operates in a parity mode, when said parity signal has said first logic state, and operates in a non-parity mode when said parity signal has a second logic state.

6. A memory, comprising:
a memory array having a predetermined number of data locations for storing data;
buffers coupled to said memory array for receiving an address, corresponding to a data location in said memory array, and for providing an output;
decoder means coupled to said buffers and said memory array for receiving said output, and for selecting a corresponding data location in said memory array, in response thereto;
a write amplifier coupled to said memory array for receiving a predetermined number of parity data bits from a source external to said memory, and for coupling a parity data bit associated with a particular write data control signal to said selected location in said memory array, in response to the particular write data control signal being asserted; and
parity write control means coupled to said write amplifier means for providing a predetermined number of write data control signals, in response to receiving a predetermined number of independent write enable signals, said parity write control means asserting the particular write data control signal when a corresponding one of said predetermined number of independent write enable signals is asserted, and allowing said write amplifier to independently write the parity data bit associated with said particular write data control signal into said selected data location in said memory array.

7. The memory of claim 6 wherein said parity write control means comprises:
input buffer means for receiving a parity signal, and said independent write enable signals, and for providing said independent write enable signals, in response to a clock signal;
selection means coupled to said input buffer means, for receiving said parity signal, and said independent write enable signals, and for selectively providing at least one of said independent write enable signals, based upon a logic state of said parity signal; and
driver means coupled to said selection means, and said input buffer means, for receiving said independent write enable signals, and for providing said predetermined number of write data control signals, in response thereto;
parity control circuitry coupled to said input buffer means, and said selection means for providing a logical true parity signal to said input buffer means, and for providing said logical true parity signal, and a complement thereof to said selection means, said parity control circuitry enabling said memory to operate in a parity mode or in a non-parity mode, based upon the logical value of said parity signal; and
option select circuitry having an input selectively coupled to either a positive power supply terminal, or a negative power supply terminal, and an output for for providing an option signal to said parity control circuitry, said option select circuitry thereby controlling the logic value of said parity signal.

8. The memory of claim 7 wherein said parity write control means provides said plurality of write enable signals when said memory is operable in said parity mode, and provides a single write enable signal when said memory is operable in said non-parity mode.

9. A data processing system comprising:
a processor for providing information via a data bus and an address bus, and for individually providing a predetermined number of addressable parity data bits;
a main memory for storing data received via the data bus;
a cache controller for receiving a requested address from said processor, and for providing a status signal indicating whether said requested address matches a set of addresses accessible by said cache controller, said cache controller also providing a plurality of independent write enable signals to allow said processor to individually write said predetermined number of addressable parity data bits; and
a cache memory, for storing a plurality of addressable data entries, with each of said plurality of addressable data entries containing a plurality of bytes of data, and for selectively storing said predetermined number of addressable parity data bits, wherein each parity data bit corresponds to one of said plurality of bytes of data in said plurality of addressable data entries, and wherein said cache memory stores a particular parity data bit in an addressable parity bit location, in response to said cache controller individually asserting each of said plurality of independent write enable signals.

10. The data processing system of claim 9 wherein said cache memory comprises:
a memory array having data locations for storing data;
buffers coupled to said memory array for receiving an address, corresponding to a data location in said memory array, and for providing an output;
decoder means coupled to said buffers and said memory array for receiving said output, and for selecting a corresponding data location in said memory array, in response thereto;
a write amplifier coupled to said memory array for receiving a predetermined number of parity data bits from a source external to said memory, and for coupling the particular parity data bit associated with a particular write data control signal to said selected location in said memory array, in response to the particular write data control signal being asserted; and
parity write control means coupled to said write amplifier means for providing a predetermined number of write data control signals, in response to receiving said predetermined number of independent write enable signals, said parity write control means asserting the particular write data control signal when a corresponding one of said predetermined number of independent write enable signals is asserted, and allowing said write amplifier to independently write the parity data bit associated with said particular write data control signal into said selected data location in said memory array.

11. The memory of claim 10 wherein said parity write control means comprises:

input buffer means for receiving a parity signal, and said independent write enable signals, and for providing said independent write enable signals, in response to a clock signal;

selection means coupled to said input buffer means, for receiving said parity signal, and said independent write enable signals, and for selectively providing at least one of said independent write enable signals, based upon a logic state of said parity signal; and driver means coupled to said selection means, and said input buffer means, for receiving said independent write enable signals, and for providing said predetermined number of write data control signals, in response thereto;

parity control circuitry coupled to said input buffer means, and said selection means for providing a logical true parity signal to said input buffer means, and for providing said logical true parity signal, and a complement thereof to said selection means, said parity control circuitry enabling said memory to operate in a parity mode or in a non-parity mode, based upon the logical value of said parity signal; and option select circuitry having an input selectively coupled to either a positive power supply terminal, or a negative power supply terminal, and an output for for providing an option signal to said parity control circuitry, said option select circuitry thereby controlling the logic value of said parity signal.

12. The circuit of claim 11 wherein said selection means provides said plurality of write enable signals in response to said parity signal having a first logic value, and provides a single write enable signal, in response to said parity signal having a second logic value.

13. A memory, comprising:

first means for selecting a location in said memory, in response to receiving an address;

second means for coupling, in response to the assertion of a particular one of a plurality of write enable signals, a parity data signal associated with the particular write enable signal to the selected location;

input buffer means for receiving a parity signal, and said plurality of write enable signals, and for providing said plurality of write enable signals, in response to a clock signal;

selection means coupled to said input buffer means, for receiving said parity signal, and said plurality of write enable signals, and for selectively providing at least one of said plurality of write enable signals, based upon a logic state of said parity signal; and driver means coupled to said selection means, and said input buffer means, for receiving said plurality of write enable signals from said selection means, and a single write enable signal from said input buffers means, and for providing a plurality of write data control signals, in response thereto, said write data control signals enabling said write amplifier to independently write a predetermined number of parity bits into said memory.

* * * * *